US011162634B2

(12) United States Patent
Lin

(10) Patent No.: US 11,162,634 B2
(45) Date of Patent: Nov. 2, 2021

(54) ELECTRONIC DEVICE AND HUNG STRUCTURE

(71) Applicant: Wistron NeWeb Corp., Hsinchu (TW)

(72) Inventor: Shang-Ping Lin, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 17/019,628

(22) Filed: Sep. 14, 2020

(65) Prior Publication Data

US 2021/0222827 A1     Jul. 22, 2021

(30) Foreign Application Priority Data

Jan. 22, 2020   (TW) ................................. 109102406

(51) Int. Cl.
| | |
|---|---|
| *F16B 12/34* | (2006.01) |
| *F16M 13/02* | (2006.01) |
| *F16B 39/22* | (2006.01) |
| *F16B 5/00* | (2006.01) |
| *F16B 21/09* | (2006.01) |

(52) U.S. Cl.
CPC ........... *F16M 13/02* (2013.01); *F16B 5/0036* (2013.01); *F16B 12/34* (2013.01); *F16B 21/09* (2013.01); *F16B 39/225* (2013.01)

(58) Field of Classification Search
CPC ........ F16B 5/0036; F16B 12/34; F16B 21/09; Y10T 403/581
USPC ............. 248/221.12, 222.41, 224.51, 223.21
See application file for complete search history.

(56) References Cited

U.S. PATENT DOCUMENTS

| | | | | | |
|---|---|---|---|---|---|
| 1,242,441 | A | * | 10/1917 | Hills ....................... | A47H 1/142 |
| | | | | | 248/263 |
| 1,571,762 | A | * | 2/1926 | Driscoll .................. | A24F 19/00 |
| | | | | | 131/241 |
| 2,193,802 | A | * | 3/1940 | Chambless ............. | F16B 21/09 |
| | | | | | 24/667 |
| 2,936,146 | A | * | 5/1960 | Wunder ................... | A47D 7/04 |
| | | | | | 248/201 |
| 3,125,316 | A | * | 3/1964 | Wilmhoff ............. | A47G 1/0655 |
| | | | | | 248/475.1 |

(Continued)

FOREIGN PATENT DOCUMENTS

| | | |
|---|---|---|
| CN | 103185193 A | 7/2013 |
| CN | 109854921 A | 6/2019 |

*Primary Examiner* — Bradley Duckworth
(74) *Attorney, Agent, or Firm* — McClure, Qualey & Rodack, LLP

(57) ABSTRACT

A hung structure is provided. The hung structure is adapted to be hung on a fastener. The hung structure includes a hung member and a restriction member. The hung member includes an opening, wherein the opening includes an insertion area and a first slot area, the fastener is adapted to pass through the opening via the insertion area, the fastener is adapted to slide from the insertion area to the first slot area, and when the fastener is in the first slot area, the hung member is supported by the fastener. The restriction member includes an affixed section, an elastic unit and a restriction section. The affixed section is affixed to the hung member. The elastic unit is connected to the affixed section. The restriction section is connected to the elastic unit, wherein the restriction section corresponds to the insertion area.

12 Claims, 8 Drawing Sheets

(56) References Cited

U.S. PATENT DOCUMENTS

| | | | | |
|---|---|---|---|---|
| 3,288,192 | A * | 11/1966 | Bollinger | F16B 33/002 411/166 |
| 3,312,983 | A * | 4/1967 | Arnold | E03C 1/33 4/650 |
| 4,398,647 | A * | 8/1983 | Ackerman | H01R 25/165 174/58 |
| 4,470,716 | A * | 9/1984 | Welch | F16B 12/38 403/254 |
| 4,783,034 | A * | 11/1988 | Ostrander | F16B 21/09 248/221.12 |
| 4,786,119 | A * | 11/1988 | Smuda | A47B 17/00 108/159.11 |
| 4,878,639 | A * | 11/1989 | Tempco | F16B 21/09 248/73 |
| 5,215,332 | A * | 6/1993 | De Sloovere | B60R 22/18 248/221.12 |
| 5,427,412 | A * | 6/1995 | Staniszewski | B60R 22/24 248/221.12 |
| 5,738,462 | A * | 4/1998 | Petersen | F16B 12/22 312/140.2 |
| 6,109,819 | A * | 8/2000 | Welch | A47B 13/003 248/222.41 |
| 6,862,758 | B1 * | 3/2005 | Lai | A47C 19/005 5/299 |
| 7,290,740 | B2 * | 11/2007 | Joy | B60R 11/00 248/187.1 |
| 8,888,201 | B2 * | 11/2014 | Chen | H05K 7/1489 312/333 |
| 2013/0168519 | A1 * | 7/2013 | In | F16M 11/105 248/314 |

* cited by examiner

ELECTRONIC DEVICE AND HUNG STRUCTURE

CROSS REFERENCE TO RELATED APPLICATIONS

This application claims priority of Taiwan Patent Application No. 109102406, filed on Jan. 22, 2020, the entirety of which is incorporated by reference herein.

BACKGROUND OF THE INVENTION

Field of the Invention

The present invention relates to a hung structure, and in particular to a hung structure including electronic elements.

Description of the Related Art

A conventional electronic device, such as a display or a wireless router, can be hung on a fastener (for example, a hook or a nail) which is affixed to a fixing surface (such as a wall). However, when the electronic device receives an unexpected strike or shake, the electronic device may become separated from the fastener, and fall. That can damage the electronic device, and may even hurt the user.

BRIEF SUMMARY OF THE INVENTION

Embodiments of the invention are provided to address the aforementioned difficulty.

In one embodiment, a hung structure is provided. The hung structure is adapted to be hung on a fastener. The hung structure includes a hung member and a restriction member. The hung member includes an opening, wherein the opening comprises an insertion area and a first slot area, the fastener is adapted to pass through the opening via the insertion area, the fastener is adapted to slide from the insertion area to the first slot area, and when the fastener is in the first slot area, the hung member is supported by the fastener. The restriction member includes an affixed section, an elastic unit and a restriction section. The affixed section is affixed to the hung member. The elastic unit is connected to the affixed section. The restriction section is connected to the elastic unit, wherein the restriction section corresponds to the insertion area, and when the fastener passes through the opening via the insertion area, the fastener pushes a section surface of the restriction section to elastically deform the elastic unit, and when the fastener is located in the first slot area, a first side of the restriction section is adapted to abut the fastener to keep the fastener in the first slot area.

In another embodiment, an electronic device is provided. The electronic device is adapted to be hung on a fastener disposed on a fixing surface. The electronic device includes a housing and a restriction member. The housing includes an opening, wherein the opening comprises an insertion area and a first slot area, the fastener is adapted to pass through the opening via the insertion area, the fastener is adapted to slide from the insertion area to the first slot area, and when the fastener is in the first slot area, the electronic device is supported by the fastener. The restriction member includes an affixed section, an elastic unit and a restriction section. The affixed section is affixed to the housing. The elastic unit is connected to the affixed section. The restriction section is connected to the elastic unit, wherein the restriction section corresponds to the insertion area, and when the fastener passes through the opening via the insertion area, the fastener pushes a section surface of the restriction section to elastically deform the elastic unit, and when the fastener is located in the first slot area, a first side of the restriction section is adapted to abut the fastener to keep the fastener in the first slot area.

Utilizing the hung structure of the embodiment of the invention, the elastic restriction member restricts the movement of the fastener. Therefore, after the hung member (such as housing) is hung on the fastener, the restriction member is adapted to abut the fastener to prevent the hung member from being separated from the fastener. When the hung member receives unexpected striking or shaking, the restriction member prevents the hung member from dropped, and the safety of the user is improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
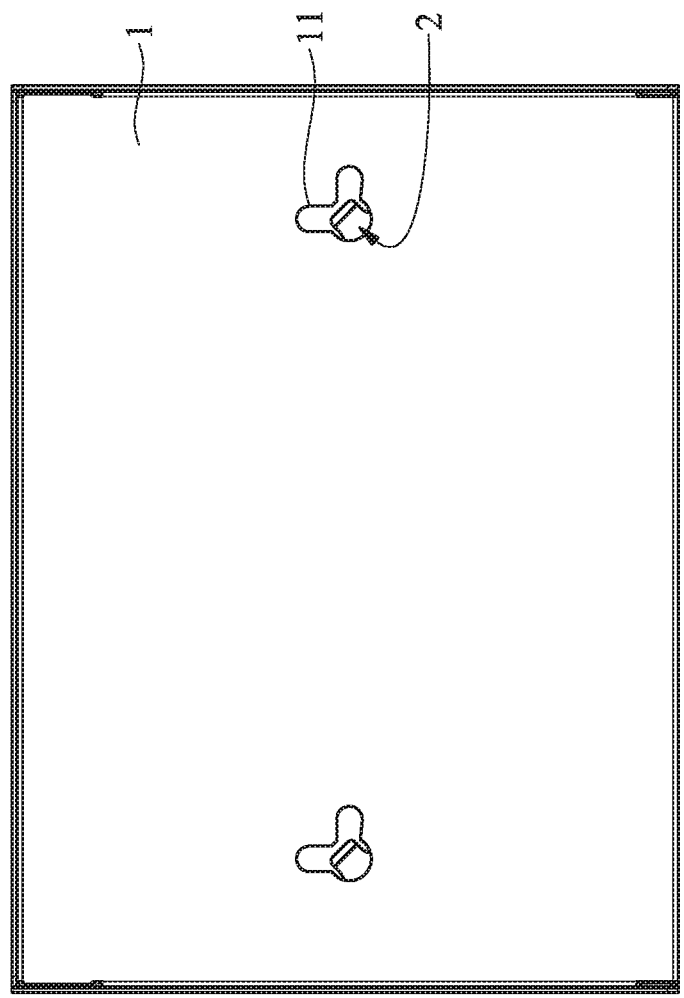
FIG. 1A is a side view of an electronic device of the embodiment of the invention.
Figure 1B:
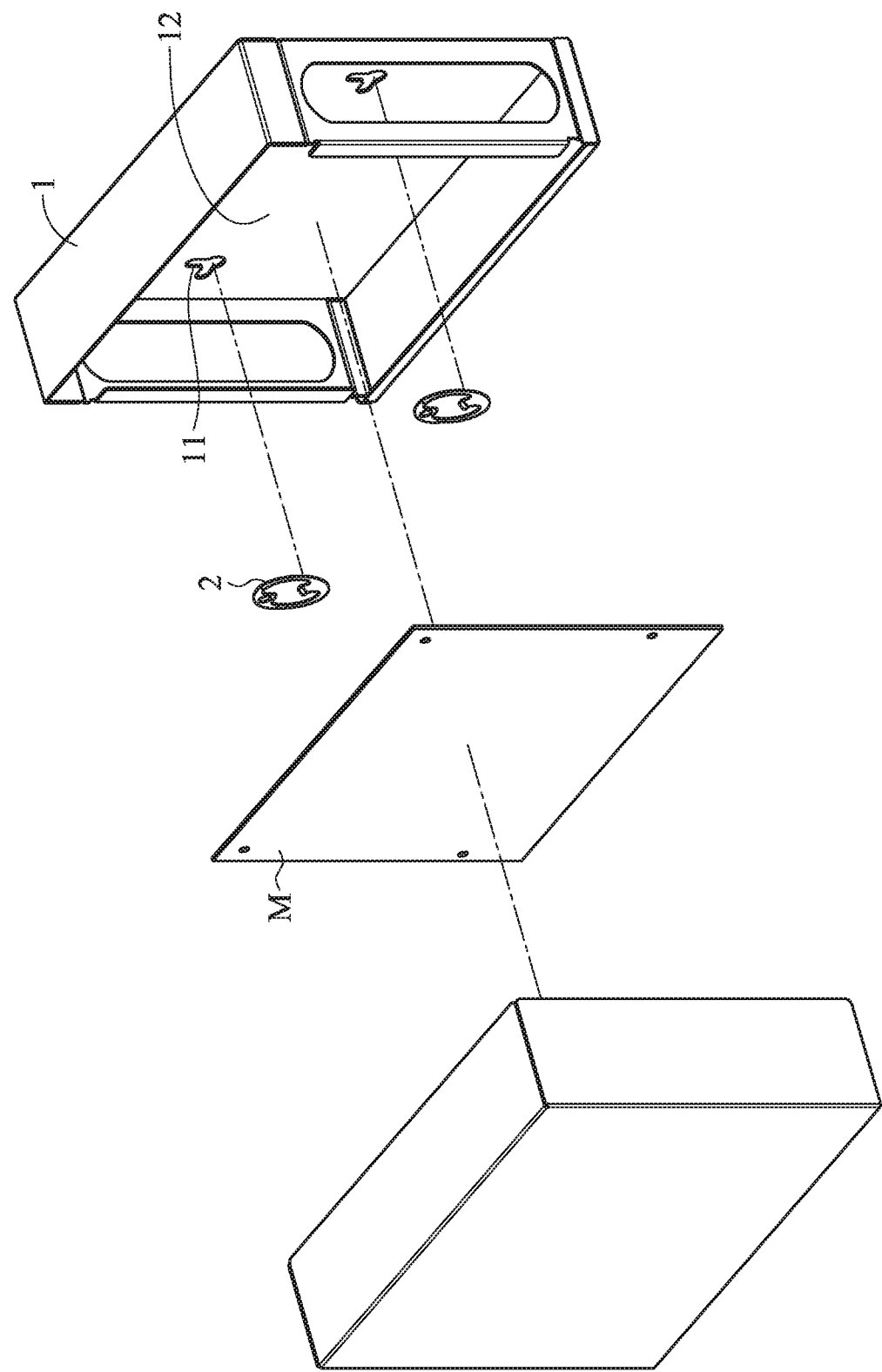
FIG. 1B is an exploded view of the electronic device of the embodiment of the invention.

FIG. 1A is a side view of an electronic device of the embodiment of the invention. FIG. 1B is an exploded view of the electronic device of the embodiment of the invention. With reference to FIGS. 1A and 1B, in one embodiment, an electronic device E is provided. The electronic device E is adapted to be hung on a fastener (for example, bolt, not shown) disposed on a fixing surface (for example, wall). The electronic device E includes a housing 1 and a restriction member 2. The housing 1 includes an opening 11. In one embodiment, the electronic device E comprises a mainboard M. The mainboard M is disposed in the housing 1, and the restriction member 2 is affixed to an inner wall 12 of the housing 1.

In one embodiment, the housing 1 can be considered as a hung member. The hung member (housing 1) and the restriction member 2 can be considered as a hung structure which is adapted to be hung on the fastener. In other words, the hung structure of the embodiment of the invention is not restricted to the electronic device, and the hung structure can be other objects.

Figure 2A:
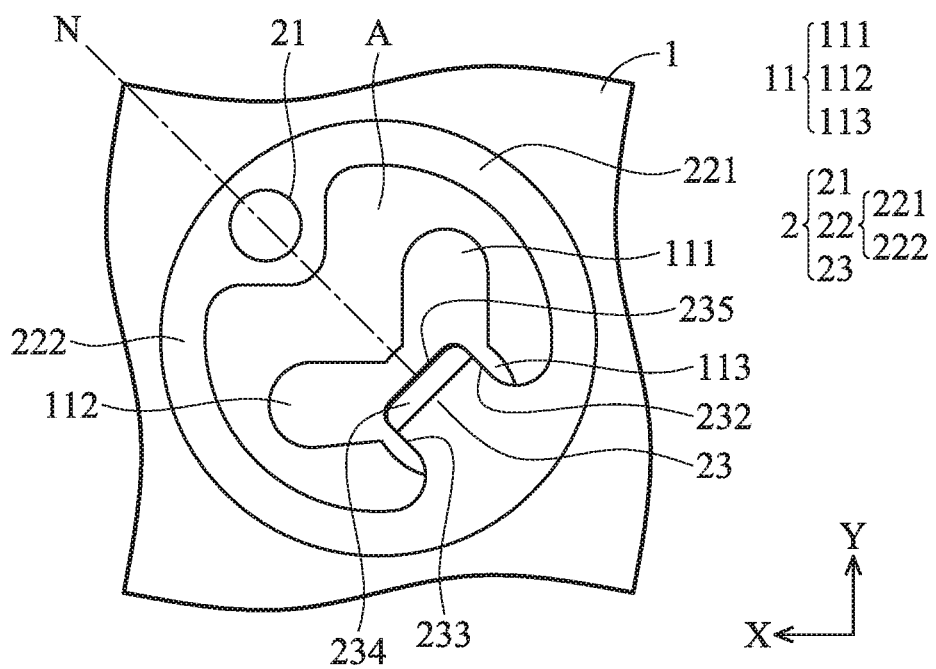
FIG. 2A shows the details of the hung structure of a first embodiment of the invention.
Figure 2B:
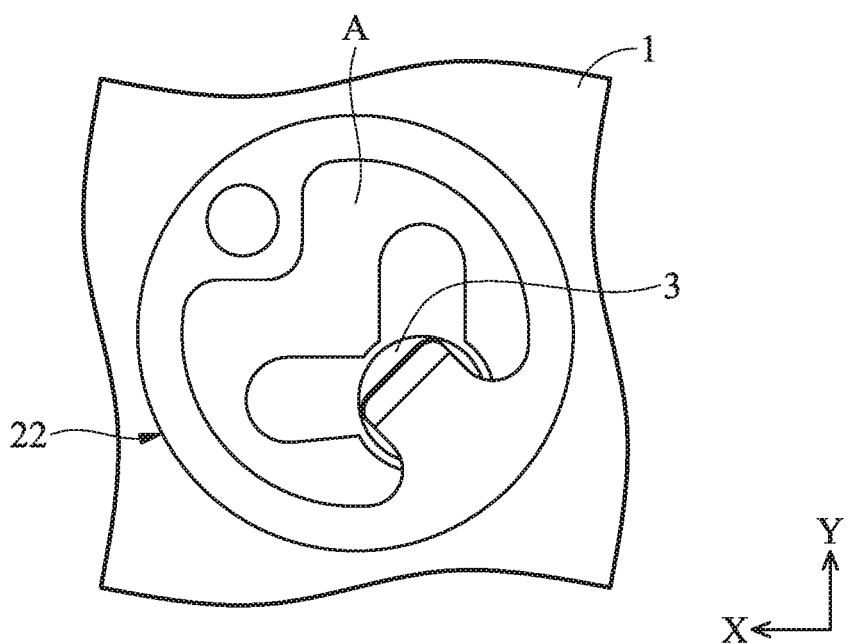
FIGS. 2B, 2C and 2D are top views of the hung structure of the first embodiment of the invention combined to the fastener.
Figure 2C:
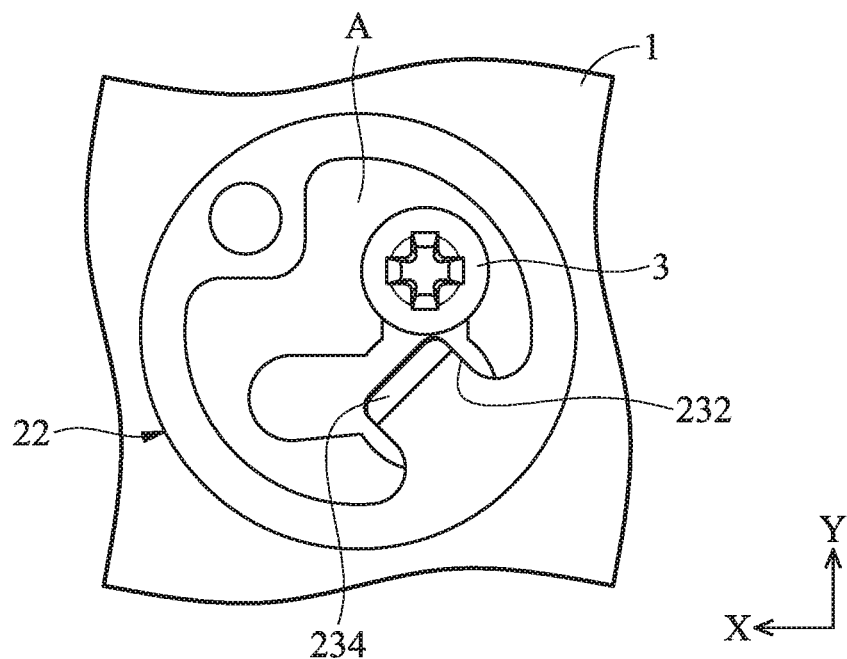
Figure 2D:
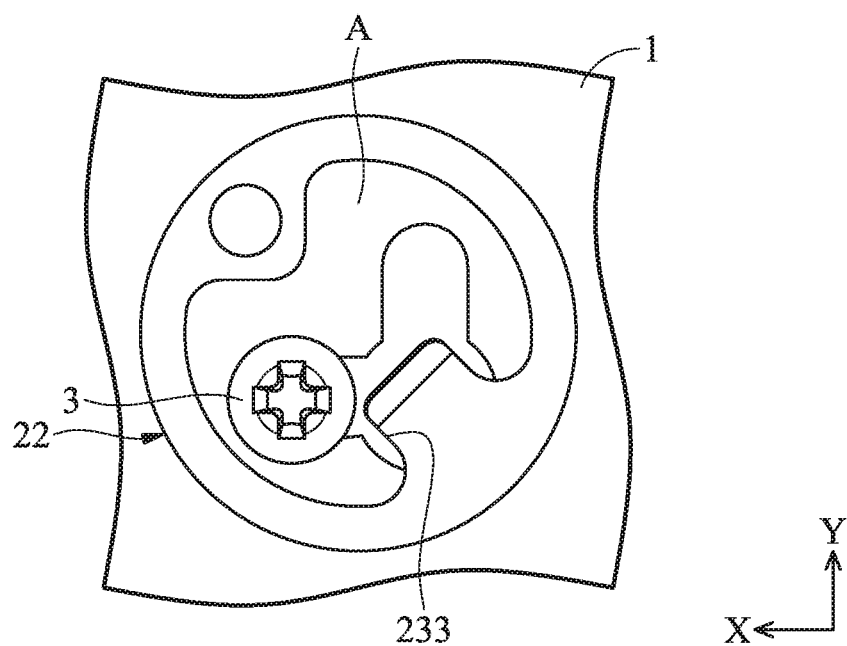

FIG. 2A shows the details of the hung structure of a first embodiment of the invention. FIGS. 2B, 2C and 2D are top views of the hung structure of the first embodiment of the invention combined to the fastener. With reference to FIGS. 2A, 2B and 2C, the opening 11 comprising an insertion area 113 and a first slot area 111. The fastener 3 is adapted to pass through the opening 11 via the insertion area 113. The fastener 3 is adapted to slide from the insertion area 113 to the first slot area 111. When the fastener 3 is in the first slot area 111, the electronic device E is supported by the fastener 3. The restriction member 2 includes an affixed section 21, an elastic unit 22 and a restriction section 23. The affixed section 21 is affixed to the housing 1. The elastic unit 22 is connected to the affixed section 21. The restriction section 23 is connected to the elastic unit 22. The restriction section 23 corresponds to the insertion area 113.

Figure 3A:
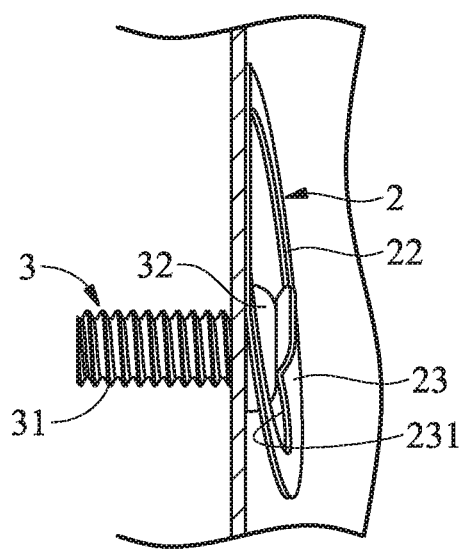
FIGS. 3A and 3B are side views of the hung structure of the first embodiment of the invention combined to the fastener.
Figure 3B:
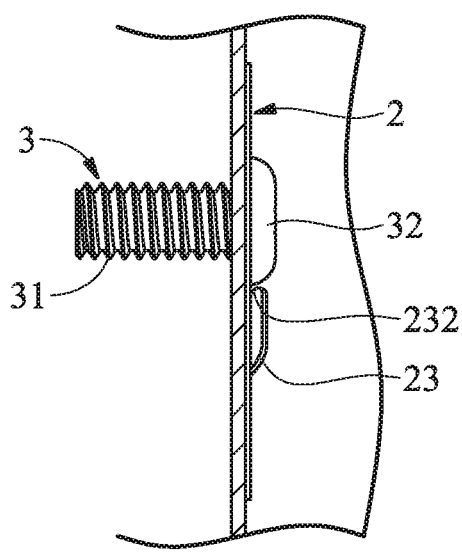

FIGS. 3A and 3B are side views of the hung structure of the first embodiment of the invention combined to the fastener. With reference to FIGS. 2B, 2C, 3A and 3B, when the fastener 3 passes through the opening via the insertion area 113, the fastener 3 pushes a section surface 231 of the restriction section 23 (lower surface, that is, the surface faces the fastener 3) to elastically deform the elastic unit 22. When the fastener 3 is located in the first slot area 111, a first side 232 of the restriction section 23 (right side, corresponding to the first slot area 111) is adapted to abut the fastener 3 to keep the fastener 3 in the first slot area 111.

With reference to FIG. 2A, in one embodiment, the elastic unit 22 comprises a first elastic arm 221 and a second elastic arm 222. One end of the first elastic arm 221 is connected to the affixed section 21, and the other end of the first elastic arm 221 is connected to the restriction section 23. One end of the second elastic arm 222 is connected to the affixed section 21, and the other end of the second elastic arm 222 is connected to the restriction section 23.

With reference to FIG. 2A, in one embodiment, the first elastic arm 221 and the second elastic arm 222 are curved. The first elastic arm 221 and the second elastic arm 222 define a surrounding area A. The opening 11 and the restriction section 23 are located in the surrounding area A. Therefore, the size of the restriction member 2 is decreased.

With reference to FIGS. 2B, 2C and 2D, in one embodiment, the opening 11 further comprises a second slot area 112. The fastener 3 is adapted to slide from the insertion area 113 to the first slot area 111 or to slide from the insertion area 113 to the second slot area 112. When the fastener 3 is in the second slot area 112, the hung member 1 (the housing of the electronic device) is supported by the fastener 3, and a second side 233 of the restriction section 23 (left side, corresponding to the second slot area 112) is adapted to abut the fastener 3 to keep the fastener 3 in the second slot area 112.

With reference to FIG. 2A, in one embodiment, the first slot area 111 extends in a first direction Y, and the second slot area 112 extends in a second direction X. The first direction Y is perpendicular to the second direction X. The second side 233 is opposite the first side 232. In one embodiment, the first elastic arm 221 is connected to the first side 232. The second elastic arm 222 is connected to the second side 233. The restriction section 23 extends from the elastic unit 22 to the affixed section 21. Utilizing the first slot area 111 and the second slot area 112 of the embodiment above, the electronic device E can be hung on the fixing surface in different orientations. In this embodiment, the electronic device E can be selectively hung on the fixing surface in a first orientation or in a second orientation, and an included angle between the first orientation and the second orientation is 90 degrees.

Figure 4:
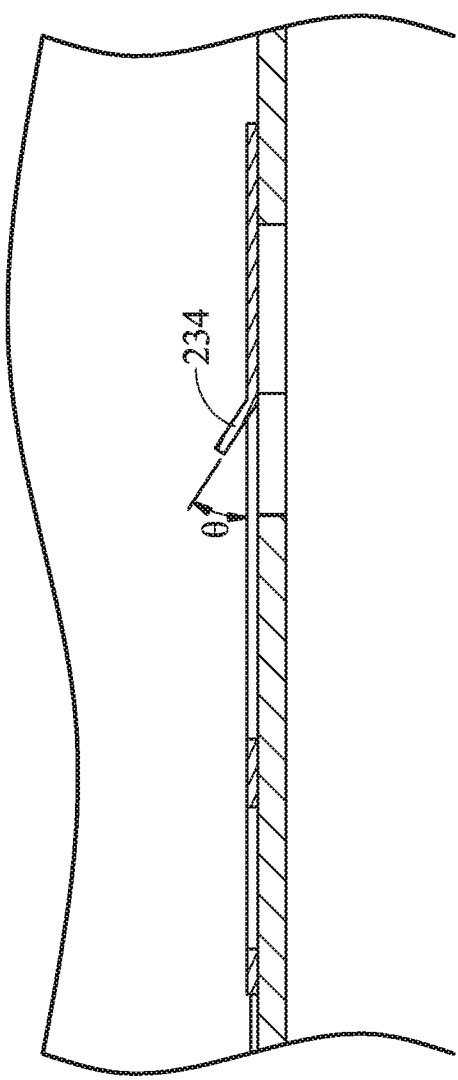
FIG. 4 shows the details of the restriction section of the first embodiment of the invention.

FIG. 4 shows the details of the restriction section of the first embodiment of the invention. With reference to FIGS. 2A and 4, in one embodiment, the restriction section 23 comprises a bent portion 234. The bent portion 234 is formed on a free end of the restriction section 23. An included angle θ is formed between the bent portion 234 and the hung member 1, and the included angle θ is between 50° and 85°. The bent portion 234 allows the fastener 3 to be easily separated from the hung structure.

With reference to FIGS. 2A, 2B, 2C, 2D, 3A and 3B, in one embodiment, the fastener 3 includes a post 31 and an abutting portion 32. The abutting portion 32 is formed on one end of the post 31. The width of the first slot area 111 is greater than the diameter of the post 31, and smaller than the diameter of the abutting portion. Therefore, the abutting portion 32 is prevented from being separated from the first slot area 111. The width of the insertion area 113 is greater than the diameter of the abutting portion 32. Therefore the abutting portion 32 can pass through the insertion area 113. When the fastener 3 is in the first slot area 111, the bent portion 234 is adapted to abut the post 31 or the abutting portion 32. Similarly, the width of the second slot area 112 is greater than the diameter of the post 31, and smaller than the diameter of the abutting portion. Therefore, the abutting portion 32 is prevented from being separated from the first slot area 111. When the fastener 3 is in the second slot area 112, the bent portion 234 is adapted to abut the post 31 or the abutting portion 32. In other words, the width of the insertion area 113 is greater than the width of the first slot area 111, and the width of the insertion area 113 is greater than the width of the second slot area 112.

In the embodiments of the invention, the fastener 3 can be a nail, a bolt, a hook or other fasteners capable to hang objects. The disclosure is not meant to restrict the invention.

With reference to FIG. 2A, in the bent portion 234 comprises a straight edge 235, and a normal line N of the straight edge 235 passes the affixed section 21. Therefore, the deformation of the elastic unit 22 can be sufficiently utilized. In one embodiment, the affixed section 21 is also located in the surrounding area A.

Figure 5B:
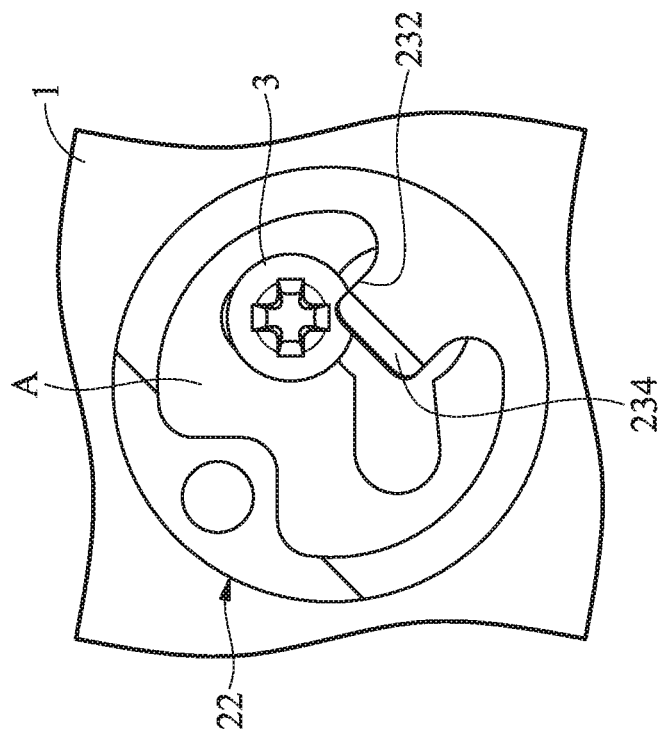
FIGS. 5A and 5B show the hung structure of the embodiment of the invention be separated from the fastener.
Figure 5A:
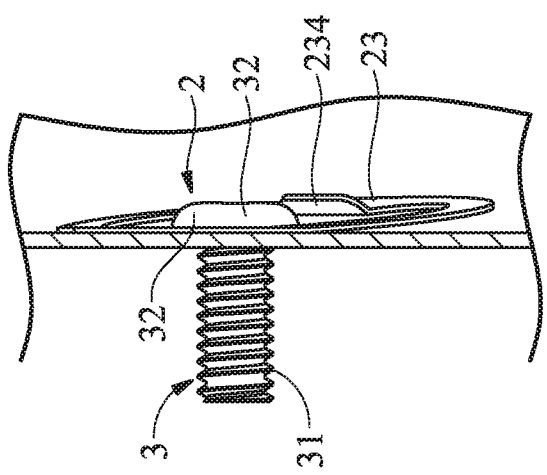

FIGS. 5A and 5B show the hung structure of the embodiment of the invention be separated from the fastener. With reference to FIGS. 5A and 5B, when the hung member 1 (the housing of the electronic device) is desired to be detached from the fastener 3, the user only needs to rotates the hung member 1 slightly to move the abutting portion 32 to the lower edge of the bent portion 234, and the fastener 3 thus can be moved back to the insertion area 113, and is adapted to be separated from the hung structure.

Figure 6B:
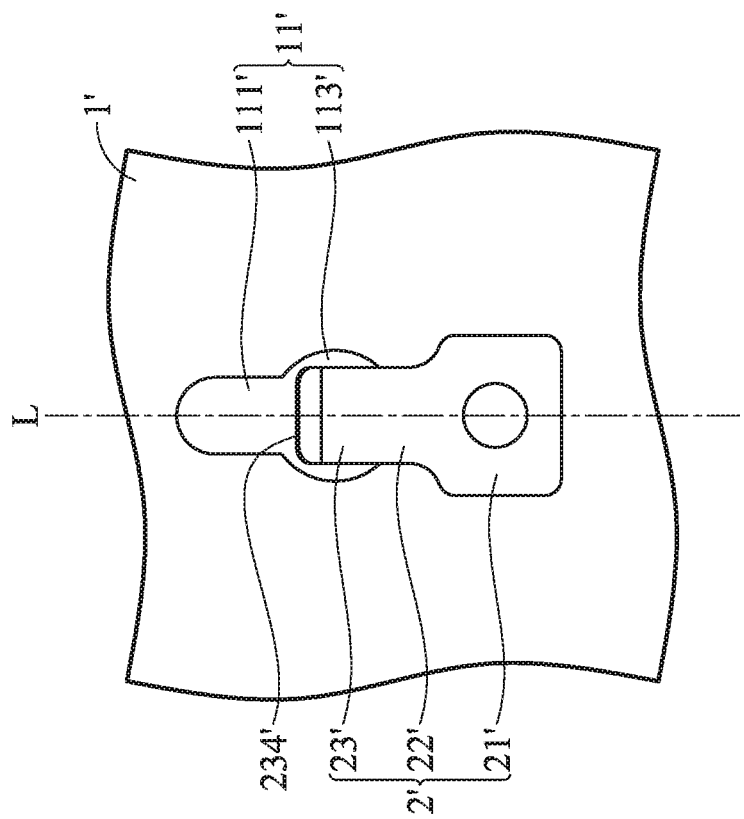
FIGS. 6A and 6B show a hung structure of a second embodiment of the invention.
Figure 6A:
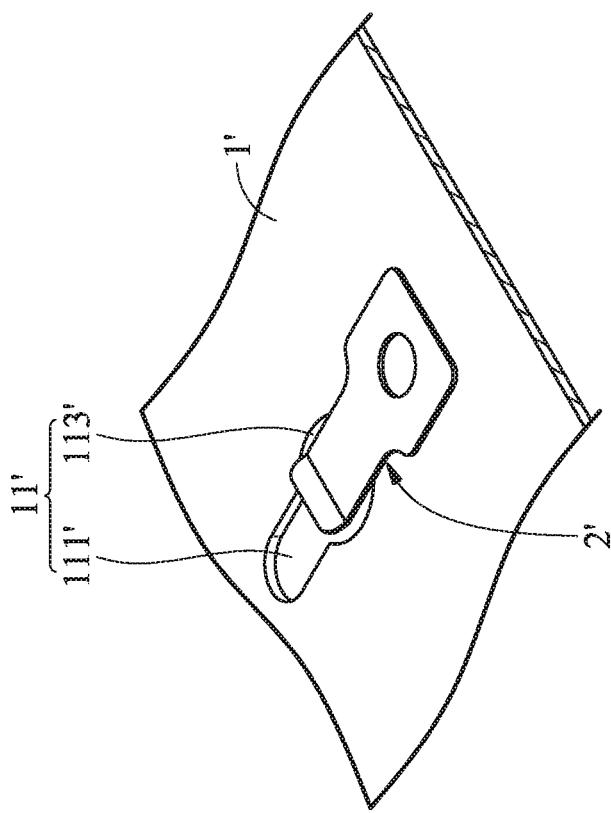

FIGS. 6A and 6B show a hung structure of a second embodiment of the invention. With reference to FIGS. 6A and 6B, in this embodiment, the hung member 1' includes an opening 11'. The opening 11' comprising an insertion area 113' and a first slot area 111'. The restriction member 2' includes an affixed section 21', an elastic unit 22' and a restriction section 23'. The affixed section 21' is affixed to the hung member 1'. The elastic unit 22' is connected to the affixed section 21'. The restriction section 23' is connected to the elastic unit 22'. The restriction section 23' corresponds to the insertion area 113'.

With reference to FIGS. 6A and 6B, the elastic unit 22' is an elastic arm. The restriction section 23' is formed on one end of the elastic arm 22'. The affixed section 21' is formed on the other end of the elastic arm 22'. In one embodiment, the elastic arm 22' is a straight sheet.

With reference to FIGS. 6A and 6B, in one embodiment, the first slot area 111' extends along a straight line L. The first slot area 111', the insertion area 113' and the affixed section 21' are arranged along the straight line L, and the insertion area 113' is located between the first slot area 111' and the affixed section 21'. Therefore, the deformation of the elastic unit 22' can be sufficiently utilized.

With reference to FIGS. 6A and 6B, similar to the embodiment above, in one embodiment, the restriction section 23' comprises a bent portion 234'. The bent portion 234' is formed on a free end of the restriction section 23'. An included angle is formed between the bent portion 234' and the hung member 1', and the included angle is between 50° and 85°. In this embodiment, a first side of the restriction section 23' (the location of the bent portion 234') is adapted to abut the fastener to keep the fastener in the first slot area 111'.

Similar to the first embodiment, the width of the first slot area 111' is greater than the diameter of the post, and smaller than the diameter of the abutting portion. The width of the insertion area 113' is greater than the diameter of the abutting portion. When the fastener is in the first slot area 111', the bent portion 234' is adapted to abut the post or the abutting portion. In other words, the width of the insertion area 113' is greater than the width of the first slot area 111'.

Utilizing the hung structure of the embodiment of the invention, the elastic restriction member restricts the movement of the fastener. Therefore, after the hung member (such as housing) is hung on the fastener, the restriction member is adapted to abut the fastener to prevent the hung member from being separated from the fastener. When the hung member receives unexpected striking or shaking, the restriction member prevents the hung member from dropped, and the safety of the user is improved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hung structure, adapted to be hung on a fastener, comprising:
   a hung member, comprising an opening, wherein the opening comprises an insertion area and a first slot area, the fastener is adapted to pass through the opening via the insertion area, the fastener is adapted to slide from the insertion area to the first slot area, and when the fastener is in the first slot area, the hung member is supported by the fastener;
   a restriction member, comprising:
   an affixed section, affixed to the hung member;
   an elastic unit, connected to the affixed section; and
   a restriction section, connected to the elastic unit, wherein the restriction section corresponds to the insertion area, and when the fastener passes through the opening via the insertion area, the fastener pushes a section surface of the restriction section to elastically deform the elastic unit, and when the fastener is located in the first slot area, a first side of the restriction section is adapted to abut the fastener to keep the fastener in the first slot area,
   wherein the elastic unit comprises a first elastic arm and a second elastic arm, one end of the first elastic arm is connected to the affixed section, the other end of the first elastic arm is connected to the restriction section, one end of the second elastic arm is connected to the affixed section, and the other end of the second elastic arm is connected to the restriction section,
   wherein the first elastic arm and the second elastic arm are curved, the first elastic arm and the second elastic arm define a surrounding area, and the opening and the restriction section are located in the surrounding area.

2. The hung structure as claimed in claim 1, wherein the opening further comprises a second slot area, the fastener is adapted to slide from the insertion area to the first slot area or to slide from the insertion area to the second slot area, and when the fastener is in the second slot area, the hung member is supported by the fastener, and a second side of the restriction section is adapted to abut the fastener to keep the fastener in the second slot area.

3. The hung structure as claimed in claim 2, wherein the first slot area extends in a first direction, the second slot area extends in a second direction, the first direction is perpendicular to the second direction, and the second side is opposite the first side.

4. The hung structure as claimed in claim 3, wherein the first elastic arm is connected to the first side, the second elastic arm is connected to the second side, and the restriction section extends from the elastic unit to the affixed section.

5. The hung structure as claimed in claim 4, wherein the restriction section comprises a bent portion, the bent portion is formed on a free end of the restriction section, an included angle is formed between the bent portion and the hung member, and the included angle is between 50° and 85°.

6. The hung structure as claimed in claim 5, wherein the width of the insertion area is greater than the width of the first slot area, and the width of the insertion area is greater than a width of the second slot area.

7. The hung structure as claimed in claim 6, wherein the bent portion comprises a straight edge, and a normal line of the straight edge passes the affixed section.

8. The hung structure as claimed in claim 4, wherein the affixed section is also located in the surrounding area.

9. An electronic device, adapted to be hung on a fastener disposed on a fixing surface, comprising:
   a housing, comprising an opening, wherein the opening comprises an insertion area and a first slot area, the fastener is adapted to pass through the opening via the insertion area, the fastener is adapted to slide from the insertion area to the first slot area, and when the fastener is in the first slot area, the electronic device is supported by the fastener;
   a restriction member, comprising:
   an affixed section, affixed to the housing;
   an elastic unit, connected to the affixed section; and
   a restriction section, connected to the elastic unit, wherein the restriction section corresponds to the insertion area, and when the fastener passes through the opening via the insertion area, the fastener pushes a section surface of the restriction section to elastically deform the elastic unit, and when the fastener is located in the first slot area, a first side of the restriction section is adapted to abut the fastener to keep the fastener in the first slot area, wherein the elastic unit comprises a first elastic arm and a second elastic arm, one end of the first elastic arm is connected to the affixed section, the other end of the first elastic arm is connected to the restriction section, one end of the second elastic arm is connected to the affixed section, the other end of the second elastic arm is connected to the restriction section, the first elastic arm and the second elastic arm are curved, the first elastic arm and the second elastic arm define a surrounding area, and the opening and the restriction section are located in the surrounding area.

10. The electronic device as claimed in claim 9, wherein the electronic device comprises a mainboard, the mainboard is disposed in the housing, and the affixed section is affixed to an inner wall of the housing.

11. The electronic device as claimed in claim 10, wherein the opening further comprises a second slot area, the fastener is adapted to slide from the insertion area to the first slot area or to slide from the insertion area to the second slot area, and when the fastener is in the second slot area, the housing is supported by the fastener, and the second side of the restriction section is adapted to abut the fastener to keep the fastener in the second slot area.

12. The electronic device as claimed in claim 11, wherein the first slot area extends in a first direction, the second slot area extends in a second direction, the first direction is perpendicular to the second direction, and the second side is opposite the first side.

* * * * *